(12) United States Patent
Huang et al.

(10) Patent No.: US 10,440,628 B2
(45) Date of Patent: *Oct. 8, 2019

(54) D2D INFORMATION PROCESSING METHOD TO INFLUENCE COMMUNICATION SERVICE FOR UES

(71) Applicant: ZTE Corporation, Shenzhen (CN)

(72) Inventors: Ying Huang, Shenzhen (CN); Lin Chen, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/563,608

(22) PCT Filed: Aug. 21, 2015

(86) PCT No.: PCT/CN2015/087850
§ 371 (c)(1),
(2) Date: Nov. 3, 2017

(87) PCT Pub. No.: WO2016/161747
PCT Pub. Date: Oct. 13, 2016

(65) Prior Publication Data
US 2018/0092022 A1    Mar. 29, 2018

(30) Foreign Application Priority Data

Apr. 10, 2015    (CN) .......................... 2015 1 0170134

(51) Int. Cl.
*H04B 7/14* (2006.01)
*H04W 40/22* (2009.01)
(Continued)

(52) U.S. Cl.
CPC ....... *H04W 40/22* (2013.01); *H04W 36/0061* (2013.01); *H04W 36/0077* (2013.01);
(Continued)

(58) Field of Classification Search
CPC ..... H04W 40/22; H04W 76/38; H04W 76/14; H04W 36/08; H04W 84/16; H04W 48/20; H04W 84/047; H04W 88/04; H04W 88/08

See application file for complete search history.

(56) References Cited

U.S. PATENT DOCUMENTS

2013/0089023 A1    4/2013    Shin
2014/0295827 A1    10/2014   Tesanovic et al.
(Continued)

FOREIGN PATENT DOCUMENTS

CN    101841824 A    9/2010
CN    102215537 A    10/2011
(Continued)

OTHER PUBLICATIONS

International Search Report in international application No. PCT/CN2015/087850, dated Jan. 12, 2016.
(Continued)

*Primary Examiner* — Abdelnabi O Musa
(74) *Attorney, Agent, or Firm* — McDonald Hopkins LLC

(57) ABSTRACT

An information processing method and a communication node are disclosed. The method is applied to a first Device-to-Device (D2D) User Equipment (UE), and includes that: auxiliary information is received from a first access node of the first D2D UE; and according to the auxiliary information, a second access node is accessed; the first access node and the second access node are of different types. A computer storage medium is also disclosed.

14 Claims, 10 Drawing Sheets

(51) Int. Cl.
| | |
|---|---|
| *H04W 76/38* | (2018.01) |
| *H04W 48/16* | (2009.01) |
| *H04W 74/08* | (2009.01) |
| *H04W 36/00* | (2009.01) |
| *H04W 88/04* | (2009.01) |
| *H04W 88/08* | (2009.01) |
| *H04W 84/04* | (2009.01) |
| *H04W 76/14* | (2018.01) |
| *H04W 48/12* | (2009.01) |

(52) U.S. Cl.
CPC ....... *H04W 48/16* (2013.01); *H04W 74/0833* (2013.01); *H04W 76/38* (2018.02); *H04W 36/03* (2018.08); *H04W 48/12* (2013.01); *H04W 76/14* (2018.02); *H04W 84/047* (2013.01); *H04W 88/04* (2013.01); *H04W 88/08* (2013.01)

(56) References Cited

U.S. PATENT DOCUMENTS

| | | | |
|---|---|---|---|
| 2014/0328310 | A1 | 11/2014 | Xu |
| 2015/0045033 | A1* | 2/2015 | Kim .................. H04B 7/15507 455/436 |
| 2015/0215764 | A1* | 7/2015 | Tavildar ................ H04W 48/08 370/254 |
| 2015/0230114 | A1 | 8/2015 | Delsol et al. |
| 2015/0365994 | A1* | 12/2015 | Yu ..................... H04W 72/1268 370/336 |
| 2016/0227518 | A1* | 8/2016 | Li ........................ H04W 72/042 |
| 2018/0049260 | A1 | 2/2018 | Aminaka et al. |
| 2018/0139681 | A1* | 5/2018 | Jung .................... H04W 40/22 |

FOREIGN PATENT DOCUMENTS

| | | |
|---|---|---|
| CN | 103052111 A | 4/2013 |
| CN | 103179575 A | 6/2013 |
| CN | 103428789 A | 12/2013 |
| CN | 103781016 A | 5/2014 |
| CN | 104349402 A | 2/2015 |
| WO | 2015004142 A1 | 1/2015 |

OTHER PUBLICATIONS

English Translation of the Written Opinion of the International Search Authority in international application No. PCT/CN2015/087850, dated Jan. 12, 2016.

Supplementary European Search Report in European application No. 15888301.7, dated Apr. 13, 2018.

Alcatel-Lucent et al: "Resolution of IR 23.713 section 7.2 FFS topics",3GPP Draft;S2-150556 was S2-150367_7.2 FFS Resolution,3rd Generation Partnership Project(3GPP),Mobile Competence Centre;650,Route Des Lucioles;F-06921 Sophia-Antipolis Cedex;France,vol. SA WG2,No. Sorrento, Italy;Jan. 26, 2015-Jan. 30, 2015 Jan. 30, 2015 (Jan. 30, 2015),XP050961657,Retrieved from the Internet: URL:http://www.3gpp.org/ftp/tsg_sa/WG2_Arch/TSGS2_107_Sorrento/Docs/[retrieved on Jan. 30, 2015].

Intel Corporation: "ON Support of Inter-cell D2D Discovery",3GPP Draft;R1-140135-Intel-Inter-Cell Discovery,3rd Generation Partnership Project(3GPP),Mobile Competence Centre;650,Route Des Lucioles;F-06921 Sophia-Antipolis Cedex;France,vol. RAN WG1,No. Prague,Czech Republic;Feb. 10, 2014-Feb. 14, 2014 Feb. 9, 2014(Feb. 9, 2014),XP050735699,Retrieved from the Internet: URL:http://www.3gpp.org/ftp/Meetings_3Gpp_SYNC/RAN/RAN1/Docs/[retrieved on Feb. 9, 2014].

Alcatel-Lucent: "Cell ID retrieval Procedure",3GPP Draft;S2-140630_Cell ID Retrieval Procedure,3rd Generation Partnership Project(3GPP),Mobile Competence Centre;650,Route Des Lucioles;F-06921 Sophia-Antipolis Cedex;France,vol. SA WG2,No. San Jose Del Cabo, Mexico;Feb. 17, 2014-Feb. 21, 2014 Feb. 17, 2014(Feb. 17, 2014),XP050770188,Retrieved from the Internet: URL:http://www.3gpp.org/ftp/Meetings_3GPP_SYNC/SA/SA2/Docs/[retrieved on Feb. 17, 2014].

Ericsson: "ProSe UE to network Relay& Service continuity solution",3GPP Draft; S2-150787_EPROSE-EXT_RELAY_SC_APRIL2,3rd Generation Partnership Project(3GPP),Mobile Competence Centre;650,Route Des Lucioles;F-06921 Sophia-Antipolis Cedex;France,vol. SA WG2,No. San Jose Del Cabo, Mexico;Apr. 13, 2015-Apr. 17, 2015 Apr. 6, 2015(Apr. 6, 2015),XP050962107,Retrieved from the Internet: URL:http://www.3gpp.org/ftp/tsg_sa/WG2_Arch/TSGS2_108_Los_Cabos/Docs/[retrieved on Apr. 6, 2015].

LG Electronics: "Service Continuity via a ProSe UE-to-Network Relay",3GPP Draft; S2-151010_TR23713_SC,3rd Generation Partnership Project(3GPP),Mobile Competence Centre;650,Route Des Lucioles;F-06921 Sophia-Antipolis Cedex;France,vol. SA WG2,No. San Jose Del Cabo, Mexico;Apr. 13, 2015-Apr. 17, 2015 Apr. 7, 2015(Apr. 7, 2015),XP050962334,Retrieved from the Internet: URL:http://www.3gpp.org/ftp/tsg_sa/WG2_Arch/TSGS2_108_Los_Cabos/Docs/[retrieved on Apr. 7, 2015].

International Search Report in international application No. PCT/CN2016/082078, dated Jul. 26, 2016.

English Translation of the Written Opinion of the International Search Authority in international application No. PCT/CN2016/082078, dated Jul. 26, 2016.

NEC, "E-UTRAN Based Discovery of ProSe Relays", 3GPP SA WG2 Meeting S2#98, S2-132559, Jul. 19, 2013 (Jul. 19, 2013), pp. 2-3.

* cited by examiner

D2D INFORMATION PROCESSING METHOD TO INFLUENCE COMMUNICATION SERVICE FOR UES

TECHNICAL FIELD

The disclosure relates to the field of communications, and in particular to an information processing method, a communication node and a computer storage medium.

BACKGROUND

With the development of radio multimedia services, people have increasing requirements for high data rate and user experience, so higher requirements are made on system capacity and coverage of the traditional cellular network. On the other hand, the popularity of social network, near-field data sharing, local advertising and other applications increases demands of people on knowing persons or things of interest nearby and communicating with them. The existing cellular network based on a cell has obvious limitations on supporting high data rate and neighboring services; in this background, a Device-to-Device (D2D) technology representing a new development trend of communication technology in future emerges at the right moment. The application of the D2D technology can lighten load of the cellular network, reduce the power consumption of battery of a User Equipment (UE), improve data rate, and improve the robustness of network infrastructure, thereby meeting requirements of the high data rate services and neighboring services well.

The D2D technology can work on an authorized frequency hand or an unauthorized frequency band, allowing multiple pieces of UE supporting a D2D function (namely a D2D UE) to perform direct discovery/direct communication in the presence of network infrastructure or in the absence of network infrastructure. There are mainly three application scenarios of the D2D technology:

(1) UE1 and UE2 perform data interaction under the coverage of the cellular network, and user plane data does not go through the network infrastructure, as mode 1 in FIG. 1;

(2) UE in an area with poor/no coverage performs relay transmission; as mode 2 in FIG. 2, UE4 with poor signal quality is allowed to communicate with the network through UE3 with network coverage nearby, thereby helping operators to extend coverage and improve capacity; and (3) when the cellular network cannot work normally because of earthquake or emergency, devices are allowed to communicate directly; as mode 3 in FIG. 1; user planes and user planes among UE5, UE6 and UE7 perform single-hop or multi-hop data communication not through the network infrastructure.

The D2D technology usually includes D2D discovery technology and D2D communication technology:

(1) the D2D discovery technology is used for judging/determining two or more pieces of D2D UE are adjacent to each other (e.g. in a range that they can perform direct D2D communication), or used for judging/determining that a first UE is adjacent to a second UE;

(2) the D2D communication technology is that direct communication can be performed on part or all of communication data among the D2D UE not through the network infrastructure.

In the application scenarios shown in FIG. 2 and FIG. 3, the D2D UE can serve as a relay node, enabling a remote D2D UE at the edge or out of coverage of the cellular network to perform cellular communication with the network through the relay node, and enabling the D2D UE to perform D2D communication through the relay node. It is impossible that the D2D UE moves at the edge of cell coverage, then the D2D UE needs to switch its access node to access the network; for example, after moving to the cell coverage, the D2D UE relaying through a relay UE can access the network through a base station; after moving out of the cell coverage, the UE accessing the network through the base station in the cell coverage can access the network only through the relay UE. However, the prior art does not provide a method for the D2D UE to change an access node, thereby influencing communication service continuity of the UE at the edge of cell coverage.

SUMMARY

In view of this, the disclosure is intended to provide an information processing method, a communication node and a computer storage medium, for at least partly solving the problem of changing a node of D2D UE in the prior art.

The technical solutions of the disclosure are implemented as follows: the first aspect of the disclosure provides an information processing method, which is applied to a first D2D UE; the method includes that:

auxiliary information is received from a first access node of the first D2D UE; and a second access node is accessed according to the auxiliary information;

the first access node and the second access node are of different types,

Alternatively, the second access node is a first base station, and the first access node is a relay node in a first cell or a second cell; the first cell is a cell of the first base station; the second cell is an adjacent cell of the first cell; and the relay node is a second D2D UE.

Alternatively, that the auxiliary information is received from the first access node of the first D2D UE includes that:

the first D2D UE receives the auxiliary information from the relay node; the auxiliary information includes at least one of cell information of the first cell, cell information of the adjacent cell of the first cell and dedicated random access resource information.

Alternatively, the cell information includes at least one of the following:

a frequency, a cell ID, a cell access barring indication and a cell access probability parameter;

the cell access barred indication is arranged to indicate that the first D2D UE is barred to access the corresponding cell; and the cell access probability parameter is arranged to control a number of UEs accessing the corresponding cell.

Alternatively, the first access node is the first base station, and the second access node is the relay node in the first cell; the first cell is the cell of the first base station; and the relay node is the second D2D UE.

Alternatively, that the auxiliary information is received from the first access node of the first D2D UE includes that:

the auxiliary information is received from the first base station; the auxiliary information includes node information of the relay node that the first D2D UE can access, wherein the relay node is the second D2D UE;

that the second access node is accessed according to the auxiliary information includes that:

the relay node is accessed according to the auxiliary information.

Alternatively, the node information includes at least one of the following:
ID of the relay node,
D2D discovery resource information used by the D2D relay node,
D2D communication resource information which can be used for D2D communication between the first D2D UE and the relay node, and
D2D communication bearer configuration information for the D2D communication between the first D2D UE and the relay node.

Alternatively, the method further includes that:
bearer control information is received; and
according to the bearer control information, switch to the second access node to perform communication data transmission.

Alternatively, that the auxiliary information is received from the first access node of the first D2D UE includes that:
the auxiliary information is received by receiving the cell information sent by the first access node in broadcast or unicast way;
or
the auxiliary information is received by receiving the dedicated random access resource information sent by the first access node in unicast way.

Alternatively, the method further includes that:
an auxiliary information acquiring request is sent to the first access node;
that the auxiliary information is received from the first access node of the first D2D UE includes that:
the auxiliary information sent by the first access node based on the auxiliary information acquiring request is received.

The second aspect of the disclosure provides an information processing method, which is applied to the first access node of the first D2D UE; the method includes that:
the auxiliary information is formed, wherein the auxiliary information is used for the first D2D UE to access the second access node; the first access node and the second access node are of different types; and
the auxiliary information is sent to the first D2D UE.

Alternatively, the second access node is the first base station, and the first access node is the relay node in the first cell or the second cell; the first cell is the cell of the first base station; the second cell is the adjacent cell of the first cell; and the relay node is the second D2D UE.

Alternatively, the auxiliary information includes at least one of the cell information of the first cell and/or the adjacent cell of the first cell and the dedicated random access resource information.

Alternatively, the cell information includes at least one of the following:
the frequency, the cell ID, the cell access barring indication and the cell access probability parameter;
the cell access barred indication is arranged to indicate that the first D2D UE is barred to access the corresponding cell; and
the cell access probability parameter is arranged to control a number of UEs accessing the corresponding cell.

Alternatively, before the auxiliary information is sent to the first D2D UE, the method further includes that:
the first base station is requested for a dedicated random access resource; and
the dedicated random access resource information sent by the first base station is received.

Alternatively, the method further includes that:
a connection release message is received from the first D2D UE; and after the connection release message is received, the connection with the first D2D UE is released;
or
when a connection release activation timer expires, the connection with the first D2D UE is released.

Alternatively, the first access node is the first base station, and the second access node is the relay node in the first cell; the first cell is the cell of the first base station; and the relay node is the second D2D UE.

Alternatively, that the auxiliary information is sent to the first D2D UE includes that:
the first base station sends the auxiliary information to the first D2D UE;
the auxiliary information includes the node information of the relay node that the first D2D UE can access, wherein the relay node is the second D2D UE.

Alternatively, the node information includes at least one of the following:
the ID of relay node,
the D2D discovery resource information used by the D2D relay node,
the D2D communication resource information which can be used for D2D communication between the first D2D UE and the relay node, and
the D2D communication bearer configuration information for the D2D communication between the first D2D UE and the relay node.

Alternatively, that the auxiliary information is formed includes that:
the relay node which can be selected by the D2D UE to access is determined; and
the auxiliary information is formed based on the determined relay node.

Alternatively, that the auxiliary information is formed includes that:
the first base station sends a relay node access request message to the relay node;
a response message that the relay node sends when allowing the first D2D UE to access based on the request message is received; and
the auxiliary information is formed based on the response message.

Alternatively, before the auxiliary information is formed, the method further includes that:
information related to the relay node is received from the first D2D UE;
the information related to the relay node is arranged to provide a basis for forming the auxiliary information.

Alternatively, the information related to the relay node may include at least one of the following:
a relay node access request indication,
the ID of relay node that the first D2D UE desires to access,
relay node information detected by the first D2D UE,
the current location information of the first D2D UE, and
results of measurement made by the first D2D UE on at least one of an accessed relay node, a serving cell, and an adjacent cell.

Alternatively, the method further includes that:
the hearer control information is sent to the first D2D UE;
the bearer control information is arranged to provide a basis for a first D2D node to switch to the second access node to perform the communication data transmission.

Alternatively, the method further includes that:
the auxiliary information acquiring request sent by the first D2D UE is received;

that the auxiliary information is formed includes that:

the auxiliary information is sent based on the auxiliary information acquiring request.

The third aspect of the disclosure provides a communication node, which is the first D2D UE; the first D2D UE includes:

a first receiving unit, which is arranged to receive the auxiliary information from the first access node of the first D2D UE; and an accessing unit, which is arranged to access the second access node according to the auxiliary information;

the first access node and the second access node are of different types.

Alternatively, the second access node is the first base station, and the first access node is the relay node in the first cell or the second cell; the first cell is the cell of the first base station; the second cell is the adjacent cell of the first cell; and the relay node is the second D2D UE.

Alternatively, the first receiving unit is configured for the first D2D UE to receive the auxiliary information from the relay node; the auxiliary information includes at least one of the cell information of the first cell and/or the adjacent cell of the first cell and the dedicated random access resource information.

Alternatively, the cell information includes at least one of the following:

the frequency, the cell ID, the cell access barring indication and the cell access probability parameter;

the cell access barred indication is arranged to indicate that the first D2D UE is barred to access the corresponding cell; and the cell access probability parameter is arranged to control a number of UEs accessing the corresponding cell.

Alternatively, the first access node is the first base station, and the second access node is the relay node in the first cell; the first cell is the cell of the first base station; and the relay node is the second D2D UE.

Alternatively, the first receiving unit is arranged to receive the auxiliary information from the first base station; the auxiliary information includes the node information of the relay node that the first D2D UE can access, wherein the relay node is the second D2D UE;

the accessing unit is arranged to access the relay node according to the auxiliary information.

Alternatively, the node information includes at east one of the following:

the ID of relay node, the D2D discovery resource information used by the D2D relay node, the D2D communication resource information which can be used for D2D communication between the first D2D UE and the relay node, and the D2D communication bearer configuration information for the D2D communication between the first D2D UE and the relay node.

Alternatively, the first receiving unit is further arranged to receive the bearer control information;

the first D2D UE further includes:

a first switching unit, which is arranged to, according to the bearer control information, switch to the second access node to perform the communication data transmission.

Alternatively, the first D2D UE further includes;

a first sending unit, which is arranged to send the auxiliary information acquiring request to the first access node;

the first receiving unit is arranged to receive the auxiliary information sent by the first access node based on the auxiliary information acquiring request.

Alternatively, the first receiving unit is arranged to receive the auxiliary information by receiving the cell information sent by the first access node in broadcast or unicast way, or receive the auxiliary information by receiving the dedicated random access resource information sent by the first access node in unicast way.

The fourth aspect of the disclosure provides a communication node, which is the first access node of the first D2D UE; the first access node includes:

a forming unit, which is arranged to form the auxiliary information, wherein the auxiliary information is used for the first D2D UE to access the second access node; the first access node and the second access node are of different types; and a second sending unit, which is arranged to send the auxiliary information to the first D2D UE.

Alternatively, the second access node is the first base station, and the first access node is the relay node in the first cell or the second cell; the first cell is the cell of the first base station; the second cell is the adjacent cell of the first cell; and the relay node is the second D2D UE.

Alternatively, the auxiliary information includes at least one of the cell information of the first cell and/or the adjacent cell of the first cell and the dedicated random access resource information.

Alternatively, the cell information includes at least one of the following:

the frequency, the cell ID, the cell access barring indication and the cell access probability parameter;

the cell access barred indication is arranged to indicate that the first D2D UE is barred to access the corresponding cell; and the cell access probability parameter is arranged to control a number of UEs accessing the corresponding cell.

Alternatively, the second sending unit is further arranged to, before sending the auxiliary information to the first D2D UE, request the first base station for the dedicated random access resource;

the first access node further includes:

a second receiving unit, which is arranged to receive the dedicated random access resource information sent by the first base station.

Alternatively, the first access node further includes:

a releasing unit, which is arranged to receive the connection release message from the first D2D UE, and after the connection release message is received, release the connection with the first D2D UE; or, the releasing unit is arranged to, when the connection release activation timer expires, release the connection with the first D2D UE.

Alternatively, the first access node is the first base station, and the second access node is the relay node in the first cell; the first cell is the cell of the first base station; and the relay node is the second D2D UE.

Alternatively, the second sending unit is configured for the first base station to send the auxiliary information to the first D2D UE;

the auxiliary information includes the node information of the relay node that the first D2D UE can access, wherein the relay node is the second D2D UE.

Alternatively, the node information includes at least one of the following:

the ID of relay node, the D2D discovery resource information used by the D2D relay node, the D2D communication resource information which can be used for D2D communication between the first D2D UE and the relay node, and the D2D communication bearer configuration information for the D2D communication between the first D2D UE and the relay node.

Alternatively, the first forming unit is arranged to determine the relay node which can be selected by the D2D UE to access, and form the auxiliary information based on the determined relay node.

Alternatively, the second sending unit is further arranged to send the relay node access request message to the relay node;

the first base station further includes:

a third receiving unit, which is arranged to receive the response message that the relay node sends when allowing the first D2D UE to access based on the request message;

the first forming unit is arranged to form the auxiliary information based on the response message.

Alternatively, the first access node further includes:

a fourth receiving unit, which is arranged to, before forming the auxiliary information, receive the information related to the relay node from the first D2D UE, wherein the information related to the relay node is arranged to provide a basis for forming the auxiliary information.

Alternatively, the information related to the relay node may include at least one of the following:

the relay node access request indication, the ID of relay node that the first D2D UE desires to access, the relay node information detected by the first D2D UE, the current location information of the first D2D UE, and the results of measurement made by the first D2D UE on the relay node, and/or the serving cell, and/or the adjacent cell that it accesses.

Alternatively, the communication node is the first base station;

the second sending unit is further arranged to send the bearer control information to the first D2D UE;

the bearer control information is arranged to provide a basis for the first D2D node to switch to the second access node to perform the communication data transmission.

Alternatively, the communication node further includes:

a sixth receiving unit, which is arranged to receive the auxiliary information acquiring request sent by the first D2D UE;

the first forming unit is arranged to send the auxiliary information based on the auxiliary information acquiring request.

The fifth aspect of the disclosure also provides a computer storage medium, in which a computer executable instruction is stored; the computer executable instruction is used for performing at least one of the above methods.

According to the information processing method, the communication node and the computer storage medium in the disclosure, the auxiliary information is acquired from the currently connected first access node, wherein the auxiliary information can be used for replacing the access node, and the second access node is accessed according to the auxiliary information; in such a manner, the ignored problem of replacing or redeploying the node of the D2D UE in the prior art is solved, and the problem of communication interruption or poor communication quality caused by not replacing the node of the D2D UE in time is also solved.

DETAILED DESCRIPTION

The technical solutions are elaborated below in combination with the accompanying drawings and specific embodiments; it should be understood that the preferred embodiments elaborated below are only used for illustrating the disclosure and not intended to limit the disclosure.

First Method Embodiment

Figure 4:
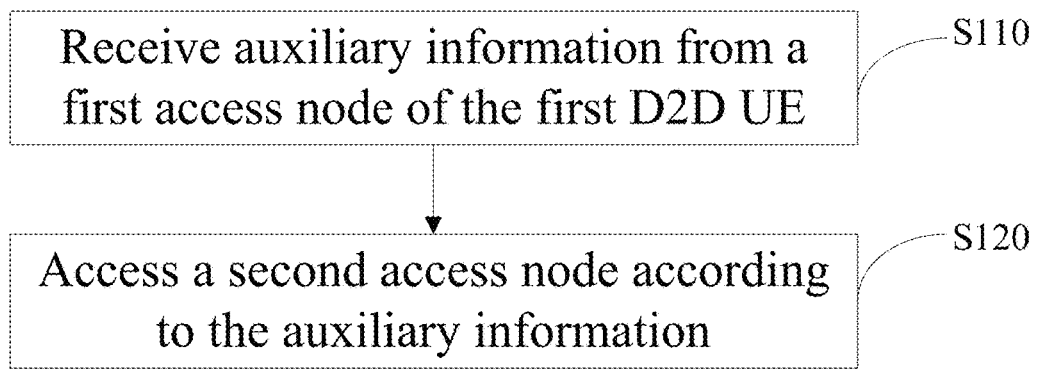
FIG. 4 is a first flowchart of an information processing method according to an embodiment of the disclosure.

As shown in FIG. 4, the present embodiment provides an information processing method, which is applied to a first D2D UE; the method includes the following steps:

In S110, auxiliary information is received from a first access node of the first D2D UE; and In S120, a second access node is accessed according to the auxiliary information;

the first access node and the second access node are of different types.

The access node in the present embodiment can be a base station or a relay node, and the relay node can be a D2D node. The D2D node is a communication device that can perform direct communication between a terminal device and a terminal device, In the present embodiment, the first access node and the second access node at least include the following two modes.

Mode 1:

the second access node is the first base station, and the first access node is the relay node in a first cell or a second cell; the first cell is a cell of the first base station; the second cell is an adjacent cell of the first cell; and the relay node is a second D2D UE. Usually in this case, the first D2D UE approaches the first base station, and can directly establish a connection with the first base station to perform communication, Mode 2:

the first access node is the first base station, and the second access node is the relay node in the first cell; the first cell is the cell of the first base station; and the relay node is the second D2D UE. Usually in this case, the first D2D UE starts to move out of a coverage area of the first base station; if the first D2D UE needs to keep communication with the first base station, it needs to be in the coverage area of the first base station, and then the second D2D UE locating at the edge of the first cell is needed to relay.

Figure 2:
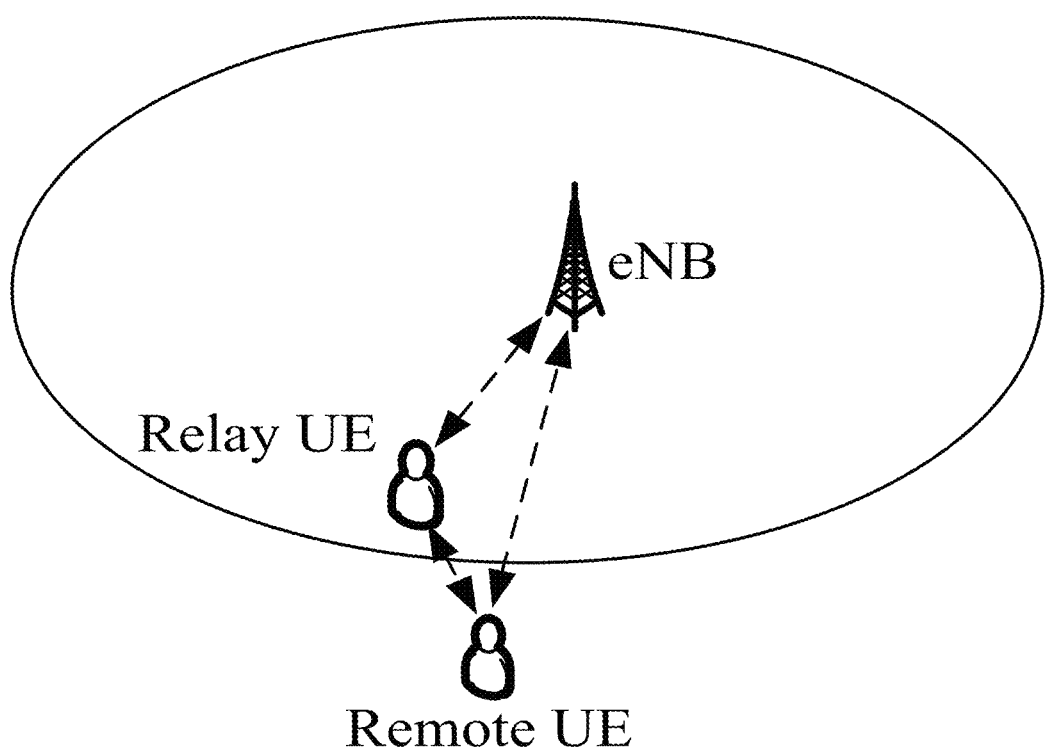
FIG. 2 is a second scenario diagram of D2D communication.
Figure 3:
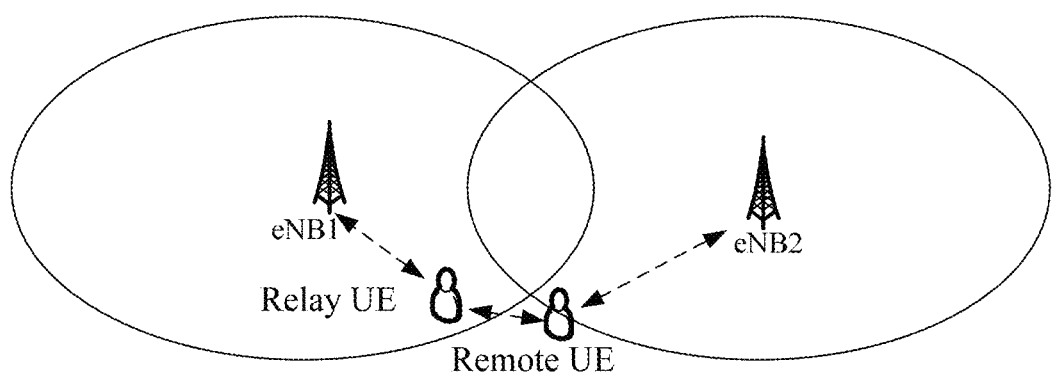
FIG. 3 is a third scenario diagram of D2D communication.

The first D2D UE can be a remote UE in FIG. 2 or FIG. 3. The second D2D UE in the embodiment can be a relay UE in FIG. 2 or FIG. 3.

In mode 1, S110 may include that:

the first D2D UE receives the auxiliary information from the relay node, wherein the auxiliary information includes at least one of cell information of the first cell, cell information of the adjacent cell of the first cell and dedicated random access resource information.

The dedicated random access resource information may include at least one of the following: random access preamble information, physical layer random access time domain resource information and physical layer random access frequency domain resource information. These pieces of information can be used for the first D2D UE to send a random access request to the first base station, so as to establish a connection with the first base station, and then switch to the first base station to perform communication data transmission.

The cell information includes at least one of the following:

a frequency, a cell ID, a cell access barring indication and a cell access probability parameter;

wherein, the cell access barred indication is arranged to indicate that the first D2D UE is barred to access the corresponding cell;

the cell access probability parameter is arranged to control a number of UEs accessing the corresponding cell.

At this time, in S110, it is the relay node that sends the auxiliary information. The relay node can send the auxiliary information by broadcast or unicast, so the first D2D UE can receive the auxiliary information from a broadcast signal or a unicast signal.

In specific implementation, the first D2D UE can also send an auxiliary information acquiring request to the relay node according to the change of the current communication requirements or communication scenarios; then, in S110, the first D2D UE receives the auxiliary information returned by the relay node in response to the auxiliary information acquiring request. If the first D2D UE measures the signal quality of the signal received from the base station at an area in which the first D2D UE is located and finds that the signal quality is very good, and a triggering condition of sending the acquiring request is satisfied, the first D2D UE sends the acquiring request to the relay node. Usually at this time, the relay node is the first D2D UE that sends the acquiring request to the relay node in unicast way.

When the relay node sends the auxiliary information in broadcast way, the first D2D UE connected with the relay node may receive the auxiliary information periodically; or when the location of the relay node deviates to satisfy a predetermined condition, the first D2D UE will receive the auxiliary information automatically pushed by the relay node. Certainly, the relay node can also actively send the auxiliary information in unicast way; specifically, if the relay node finds by detecting that each first D2D UE can perform the communication data transmission through the first base station, it can automatically push the auxiliary information to the first D2D UE, at this time, the first D2D node will acquire from the relay node the auxiliary information which is automatically pushed by the relay node in unicast way.

The frequency can be frequency information which can be used for the first cell or the second cell to perform communication. The cell ID can be a cell number or other information of the first cell or the second cell. The second cell is the cell which is formed by the second base station and is adjacent to the first cell. The second base station can be different from the first base station. For example, the first base station can be eNB2 in FIG. 3, and the second base station can be eNB1.

The cell access probability parameter can be usually a number between 0 and 1; in communications, the first D2D UE can generate a random number; if the random number is less than the cell access probability parameter, the first D2D UE requests accessing the first base station. In such a manner, the cell access probability parameter can control a number of UEs taking the first base station as the access node to access the first base station.

In mode 2,

S110 may include that: the auxiliary information is received from the first base station, wherein the auxiliary information includes node information of the relay node that the first D2D UE can access, wherein the relay node is the second D2D UE;

S120 may include that: the relay node is accessed according to the auxiliary information.

The node information includes at least one of the following: ID of the relay node, D2D discovery resource information used by a D2D relay node, D2D communication resource information which can be used for D2D communication between the first D2D UE and the relay node, and D2D communication bearer configuration information for the D2D communication between the first D2D UE and the relay node. The D2D discovery resource information is the resource information which can be used for performing D2D discovery; the D2D discovery resource information can include either information of a single D2D discovery resource, or information of a D2D discovery resource pool. The D2D communication resource information can be resource information which can be used for performing D2D communication; the D2D communication resource information can include information of a single D2D communication resource, or information of a D2D communication resource pool.

When the nodes that the first D2D UE accesses include both the first access node and the second access node, or the access node for the first D2D UE is changed from the first access node to the second access node, it may be needed to replace the first access node with the second node to perform the communication data transmission of the first D2D UE.

So, based on the above solution, the information processing method of the disclosure further includes the following steps:

In S130, bearer control information is received; and

In S140, according to the bearer control information, the current node is replaced with the second access node to perform the communication data transmission.

S130 can be performed before S110 or after S110, and the method is not limited to a specific sequence.

Usually, a bearer handover message is sent by the base station, for example, the first base station.

There are at least two types of bearer handover message sent by the first base station.

The first type is that: the bearer control information includes a bearer handover indication; the bearer handover indication is arranged to indicate that the first D2D UE switches to the second access node to perform the communication data transmission.

When the first base station is the first access node, the bearer handover message can be received before S110 or after S110; when the first base station is the second access, the bearer handover message is usually received after the first D2D UE accesses the first base station.

The bearer handover indication is arranged to indicate that the first D2D UE switches to the first base station or the relay node to perform the communication data transmission. At this time, after receiving a bearer handover request, the first base station can determine whether to allow the first D2D UE to access the first base station according to the current load of itself or the relay node and the communication quality of a channel with the first D2D UE; if so, the first base station will send the bearer handover indication to the first D2D UE, and then the first D2D UE will receive the bearer handover indication; or else, the first D2D UE may directly receive from the first base station a message about failure of the bearer handover request. So, in this mode, it is the first base station that determines that the first D2D UE is allowed to switch to the first base station to perform network access.

The second type is that:

the bearer handover message includes bearer handover decision parameter information. The bearer handover determination parameter information includes at least one of measurement threshold value of Radio Resource Management (RRM) and measurement threshold value of D2D communication. So after measuring a reference signal and other signals sent by the first base station and judging according to the measurement threshold value, the first D2D UE can determine whether it is possible to switch to the second access node to perform the communication data transmission. Apparently, in this mode, whether it is possible to switch to the second access node to perform the communication data transmission is determined by the first D2D UE.

At this time, S140 may include that: channel measurement is performed based on a measurement signal sent by the first base station, and a first measurement result is formed; it is determined, according to the bearer handover decision parameter information and the first measurement result, whether it is possible to switch to the second access node to perform the communication data transmission; if it is determined, according to the bearer handover decision parameter information and the first measurement result, that it is possible to switch to the second access node to perform the communication data transmission, the first D2D UE switches to the second access node.

Before the first D2D UE switches to the second access node to perform the communication data transmission according to the bearer control information, the method further includes that:

bearer handover decision auxiliary information is sent to the first base station.

The hearer handover decision auxiliary information of the disclosure can be arranged to provide a basis for the first base station to form the bearer control information, for example, providing a basis for the first base station to determine whether to send the bearer handover indication or failure of the bearer handover request to the first D2D UE, or providing a basis for the first base station to determine the measurement threshold value of RRM and the measurement threshold value of D2D communication, so that the first base station controls the access of the first D2D UE.

The bearer handover decision auxiliary information also includes at least one of the following: UE-to-network relay indication information, a measurement report and location information; location information; the UE-to-network relay indication information is arranged to indicate that the first D2D UE performs data transmission through a UE-to-network relay currently; the measurement report includes results of RRM measurement made by the first D2D UE on the current serving cell and/or adjacent cell; the location information includes the current geographical location information of the first D2D UE. These pieces of information can help the first base station to determine content of a response message. Specifically, for example, the current location of the first D2D UE is at the edge of the cell of the first base station, if at this time, the first D2D UE directly switches to the first base station to perform communication data transmission, the problem of bad communication effect may occur, and then the first base station can form, according to the location information, the response message of not allowing the first D2D UE to switch to the first base station to access a network, or increase the measurement threshold value of RRM.

If the first D2D UE needs to send the measurement report to the first base station, the method further includes that: before sending the measurement report to the first base station, the UE receives measurement report configuration information sent by the first base station; channel measurement is performed according to the measurement report configuration information to form a second measurement result; when the second measurement result satisfies a reporting condition, the measurement report is sent to the first base station.

That the measurement result satisfies the reporting condition here can include, but is not limited to, that it is found through the channel measurement that the intensity of the signal sent from the first base station to the first D2D UE reaches an intensity threshold.

After accessing the second access node, the first D2D UE can either keep the connection with the first D2D access node, or release the connection with the first access node; the release may includes that after a connection release message is received from the first access node, the connection with the first access node is released based on the connection releasing message, or after the connection release activation timer in the first D2D UE expires, the connection with the first access node is released.

The present embodiment provides a D2D UE; during movement, by the method of switching from the access node from the base station to the relay node or from the relay node to the base station due to the movement, the ignored problem, caused by change of the location information of the D2D UE, in the prior art that communication is interrupted or communication quality is not good enough or delay is large is solved.

Second Method Embodiment

Figure 5:
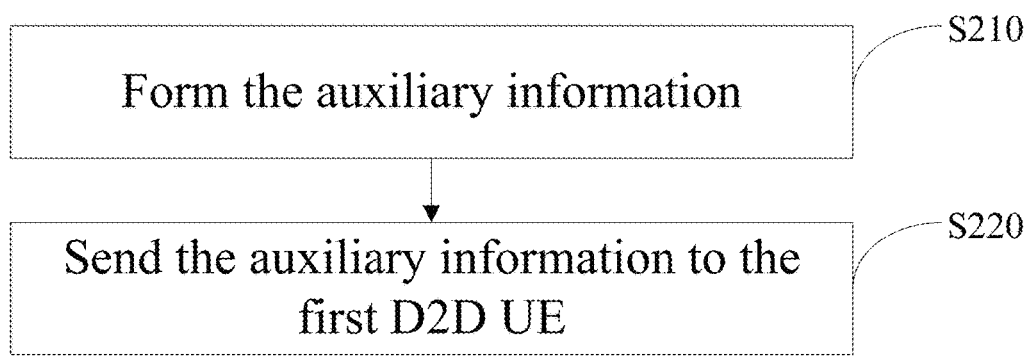
FIG. 5 is a second flowchart of an information processing method according to an embodiment of the disclosure.

As shown in FIG. 5, the present embodiment provides an information processing method, which is applied to the first access node of the first D2D UE; the method includes the following steps:

In S210, the auxiliary information is formed, wherein the auxiliary information is used for the first D2D UE to access the second access node: the first access node and the second access node are of different types; and In S220, the auxiliary information is sent to the first D2D UE.

Figure 1:
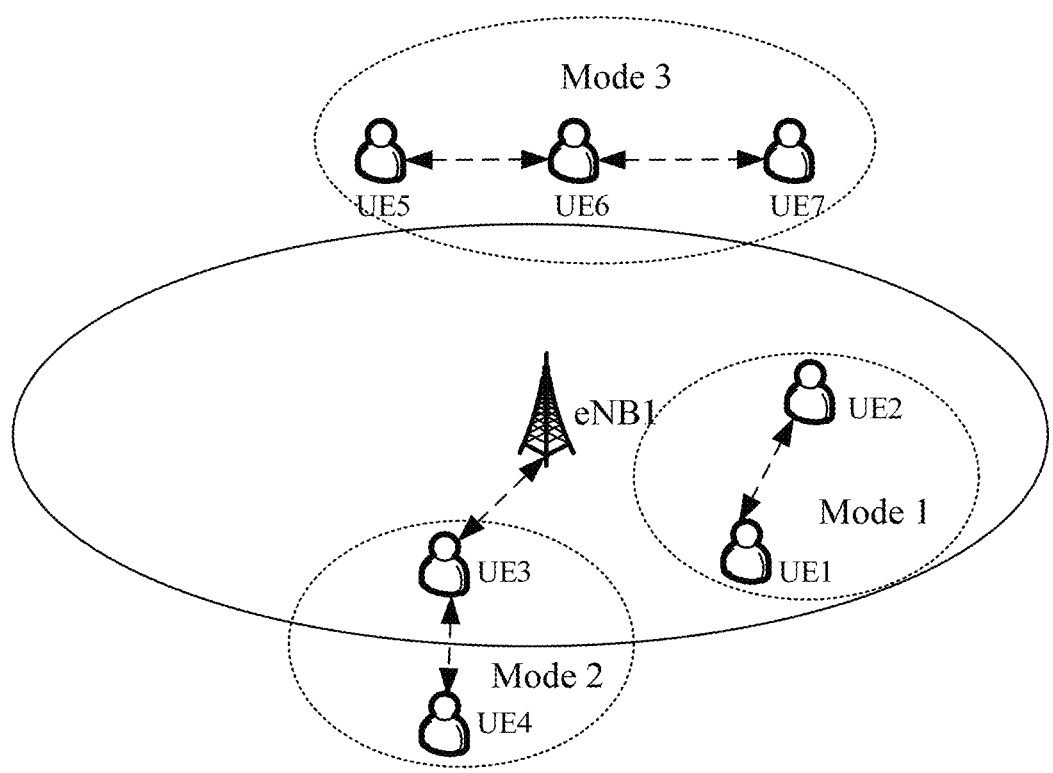
FIG. 1 is a first scenario diagram of D2D communication.

In the present embodiment, the first access node can be either the base station, for example, the eNB in FIG. 1, FIG. 2 and FIG. 3, or the D2D UE, for example, the relay UE in FIG. 1, FIG. 2 and FIG. 3.

In the present embodiment, the first access node will form the auxiliary information; these pieces of auxiliary information will be sent to the first D2D UE, so that the first D2D UE determines, according to the auxiliary information, whether it needs to switch to the second access node to perform the communication data transmission. In such a manner, the ignored problem in the prior art that the communication quality is deteriorated or the communication quality is poor caused by movement of the first D2D UE can be solved.

The second access node is the first base station, and the first access node is the relay node in the first cell or the second cell; the first cell is the cell of the first base station; the second cell is the adjacent cell of the first cell; and the relay node is the second D2D UE.

The second cell here is formed by the second base station and is adjacent to the first cell.

At this time, the auxiliary information includes at least one of the cell information of the first cell and/or the adjacent cell of the first cell and the dedicated random access resource information.

The cell information includes at least one of the following:

the frequency, the cell ID, the cell access barring indication and the cell access probability parameter;

the cell access barred indication is arranged to indicate that the first D2D UE is barred to access the corresponding cell; and the cell access probability parameter is arranged to control the number of UEs accessing the corresponding cell.

The dedicated random access resource information can refer to the above-mentioned embodiment, so it will not be repeated here.

Before the auxiliary information is sent to the first D2D UE, the method further includes that:

the first base station is requested for the dedicated random access resource; and the dedicated random access resource information sent by the first base station is received.

Apparently, the random access resource information in the present embodiment can be one of basis information for forming the auxiliary information or one of information contents of the auxiliary information.

When the first D2D UE switches to the first base station to perform the communication data transmission, in order to reduce resource waste, it is usually needed to release the connection between the first D2D UE and the relay node. Two relay connection release modes are provided below.

Relay connection release mode 1:

the connection release message is received from the first D2D UE;

after the connection release message is received, the connection with the first D2D UE is released. In specific implementation, in order to ensure the complete transmission of data of the first D2D UE in the process of changing the access node, in the application, the connection is released after the relay node receives appointed time in the connection release message, so as to avoid the problem that the first D2D UE does not access the network caused by interruption of the communication data transmission, or unstable connection with the first base station, or poor signal quality, wherein the interruption of the communication data transmission, or the unstable connection with the first base station, or the poor signal quality is caused by the first D2D UE has no time, because of immediate release, to successfully switch to the first base station.

Relay connection release mode 2:

the connection release message is received from the first D2D UE; and after the connection release message is received, the connection with the first D2D UE is released; or when the connection release activation timer expires, the connection with the first D2D UE is released.

The connection release activation timer is connected in the relay node; usually, the connection release activation timer starts to time when the first D2D UE sends data to the relay node or the relay node sends data to the first D2D UE. When the connection release activation timer expires, a relay connection with the first D2D UE is released automatically.

If the first access node is the first base station, the second access node is the relay node in the first cell; the first cell is the cell of the first base station; and the relay node is the second D2D UE.

At this time, S220 may include that:

the first base station sends the auxiliary information to the first D2D UE;

the auxiliary information includes the node information of the relay node that the first D2D UE can access, wherein the relay node is the second D2D UE.

Usually at this time, the node information includes at least one of the following: the ID of relay node, the D2D discovery resource information used by the D2D relay node, the D2D communication resource information which can be used for D2D communication between the first D2D UE and the relay node, and the D2D communication bearer configuration information for the D2D communication between the first D2D UE and the relay node. These pieces of information can provide a basis for the first D2D UE to access the node.

Figure 6:
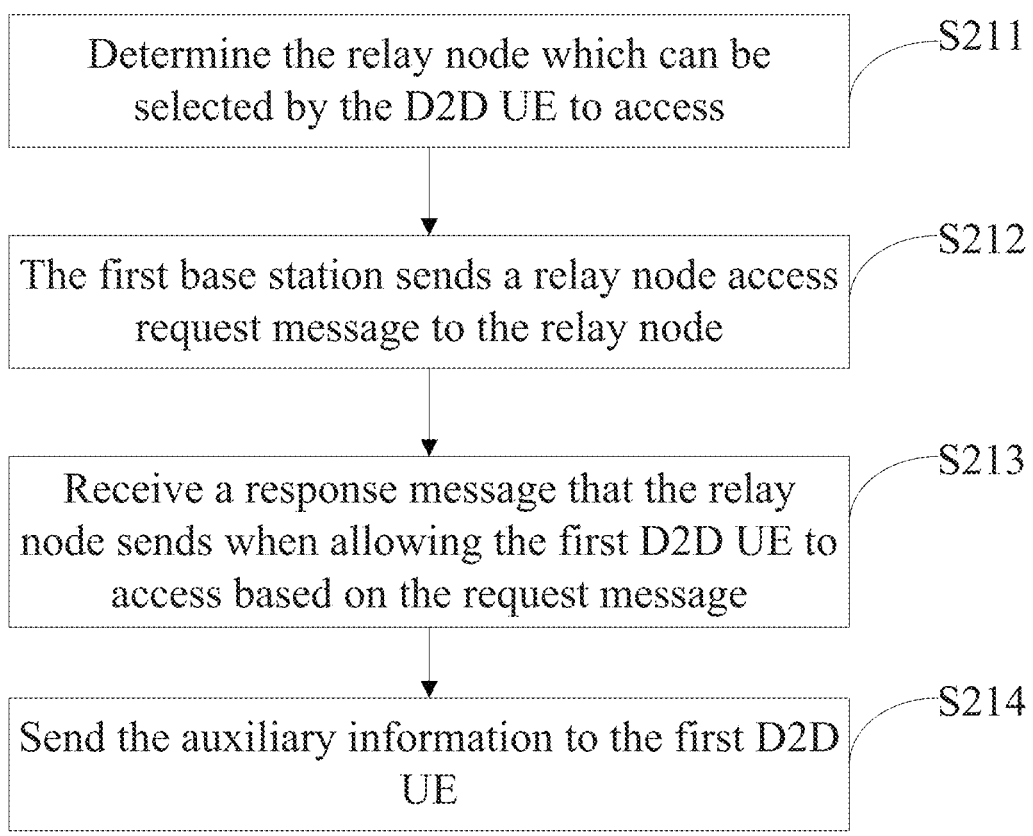
FIG. 6 is a flowchart that a first access node forms auxiliary information according to an embodiment of the disclosure.

The method further includes that: the relay node which can be selected by the D2D UE to access is determined; specifically, S210 may include that: the auxiliary information is formed based on the determined relay node. As shown in FIG. 6, S210 may include the following steps:

In S211, the relay node which can be selected by the D2D UE to access is determined;

In S212, the first base station sends a relay node access request message to the relay node;

In S213, a response message that the relay node sends when allowing the first D2D UE to access based on the request message is received; and S214: the auxiliary information is formed based on the response message.

In the present embodiment, a method about how to form the auxiliary information is provided, which is advantaged in being simple and convenient to implement. When the relay node which can be provided for the first D2D UE to access is determined in S211, the relay node is determined according to the current location of the first D2D UE and the location of each D2D UE which can serve as the relay node. In S213, the first base station sends the relay node access request message to the relay node selected in S211.

Before S210, the method further includes that: information related to the relay node is received from the first D2D UE, wherein the information related to the relay node is used for notifying the first base station that the first D2D UE requests switching to the relay node to perform the communication data transmission.

At this time, the first D2D UE may specify the relay node that it desires to access, or the first D2D UE finds, through D2D discovery or other ways, the relay node that can be provided for it to access, and then the first D2D UE sends these pieces of information to the first base station serving as the first access node, so that the first base station forms, by determining, the auxiliary information for the first D2D UE to change the access node.

In the present embodiment, the information related to the relay node may include at least one of the following, but is not limited to the following contents:

a relay node access request indication, the ID of the relay node that the first D2D UE desires to access, relay node information detected by the first D2D UE, the current location information of the first D2D UE, and results of measurement made by the first D2D UE on at least one of an accessed relay node, a serving cell, and an adjacent cell.

The serving cell can be the cell providing services for the first D2D UE; the adjacent cell can be the adjacent cell of the serving cell.

To sum up, the present embodiment describes, from the side of the access node connected with the first D2D UE, how to implement switching of the access node of the first D2D UE, which is advantaged in being simple and convenient to implement, and can be convenient for the first D2D UE to flexibly change the access node according to specific application scenarios, thereby improving the communication quality.

After the first D2D UE changes the node, or when it is connected to two access nodes at the same time, there may be a problem of bearer handover, for example, the first D2D UE switches to the second access node to perform the communication data transmission. At this time, the method further includes that:

In S230, the bearer control information is sent to the first D2D UE;

the bearer control information is arranged to provide a basis for a first D2D node to switch to the second access node to perform the communication data transmission.

There is no certain sequence between S230 and S210, and S230 can be performed before S210 or before S220. Usually, the communication node sending the bearer control information is the first base station; when the first base station is the second access node, S230 is performed after S210.

The bearer control information includes the bearer handover indication or the bearer handover decision parameter information.

The bearer handover indication is arranged to indicate that the first D2D UE switches to the second access node to perform the communication data transmission; the bearer handover decision parameter information is used for the first D2D UE to determine whether it is possible to switch to the second access node to perform the communication data transmission.

Usually, the bearer handover indication directly indicates the first D2D UE to perform bearer handover, so as to perform the communication data transmission through the second access node; then, the first D2D UE will no longer perform decision and other operations. If it is the bearer handover decision parameter information that is sent to the first D2D UE, after receiving the bearer handover decision parameter information, the first D2D UE performs channel measurement and determine channel measurement results according to the bearer handover decision parameter information, and then determines whether to perform bearer handover.

As a further improvement of the present embodiment, before the bearer control information is sent to the first D2D UE, the method further includes that: the bearer handover decision auxiliary information sent by the first D2D UE is received; and the bearer control information is formed according to the bearer handover decision auxiliary information.

The bearer handover decision auxiliary information further includes at east one of the following:

the UE-to-network relay indication information, the measurement report and the location information;

the UE-to-network relay indication information is arranged to indicate that the first D2D UE performs data transmission through the UE-to-network relay currently;

the measurement report includes the results of RRM measurement made by the first D2D UE on the current serving cell and/or adjacent cell, and/or the results of measurement made by the UE on the signals sent by the first access node;

the location information includes the current geographical location information of the first D2D UE.

The measurement report is formed when the second measurement result satisfies the reporting condition.

The above two modes are advantaged in being simple and convenient to implement, solving the problem of bearer handover caused by movement of the UE.

Two specific examples are provided below in combination with any above embodiment.

EXAMPLE 1

Figure 7:
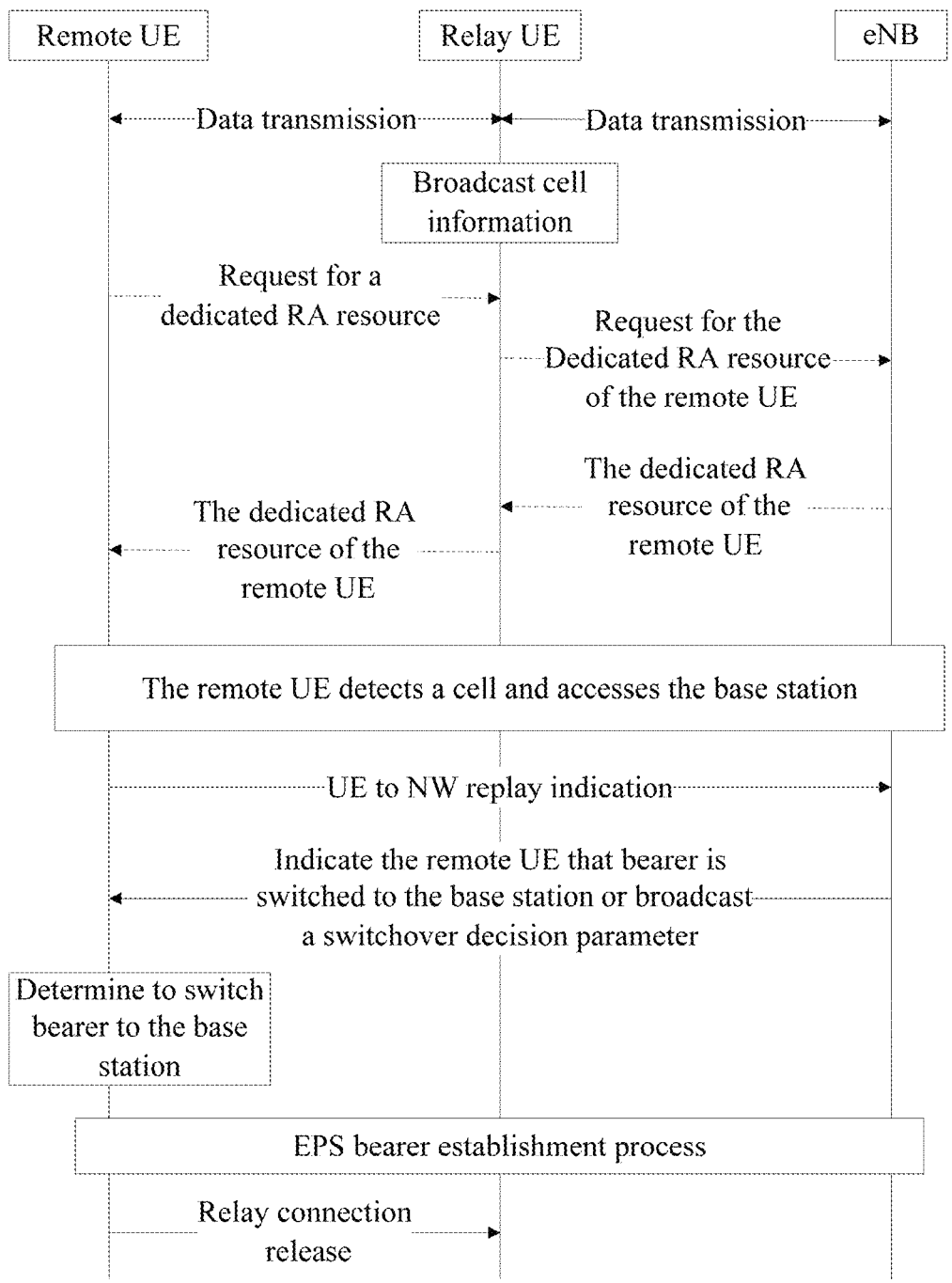
FIG. 7 is a first schematic diagram of replacing an access node according to an example of the disclosure.

The example describes the flow of a method that a remote UE of the relay UE switches to the base station to access the network after moving to the coverage area of the base station. FIG. 7 is the flowchart of the method of the example, including the following steps.

In S401, in the current scenario, the remote UE performs data transmission with the eNB through the relay UE, and the relay UE can sends the auxiliary information by broadcast, so as to help the remote UE detect the nearby cells faster. For example, the auxiliary information is information of the cell where the relay UE is or the adjacent cell. The cell information can include one or a combination of the following: the frequency, the cell ID, the cell access barring indication and the cell access probability parameter.

The cell access barred indication is arranged to indicate that the cell is not allowed to be accessed; for example, when the load of the cell is heavy, the cell access probability parameter can also be arranged to control the number of UEs accessing the cell; for example, the value range of the cell access probability parameter is 0-1, the remote UE can select a random number in a range of 0-1, if the random number is less than the cell access probability parameter, the remote UE considers that the cell can be accessed; or else, the remote UE considers that the cell cannot be accessed.

The relay UE can learn load conditions of the serving cell and/or the adjacent cell according to an Access Class Barring (ACB) parameter value broadcast in a system message SIB of the serving cell and/or the adjacent cell. Moreover, in consideration of load balancing, the relay UE can merely send information of the cell in which it is located and/or the adjacent cell with relatively light load to the remote UE. For example, if the load of the cell in which the relay UE is located is heavy (which can be judged by the relay UE according to an AC parameter), then it is indicated that the cell in which the relay UE is located is barred to be accessed or the cell access probability parameter is broadcast, or the frequency/Physical Cell Identity (PCI) information of the cell in which the relay UE is located is not broadcast, so as to prevent the UE from detecting and attempting to access the cell in which the relay UE is located.

Moreover, in addition to being sent by the relay UE by broadcast, the auxiliary information can also be acquired by the remote UE through actively requesting the relay UE. For example, the remote UE requests the relay UE for the auxiliary information when detecting that it is moving into the coverage area of the cell.

In S402, if the remote UE desires to perform a non-contention RA process, it can request the relay UE for dedicated RA resources. The dedicated RA resources include a dedicated random access preamble and dedicated time and frequency domain resources.

In S403, alternatively, after receiving a dedicated RA resource request, the relay UE can request the base station for the dedicated RA resources for the remote UE.

In S404, if the base station receives the dedicated RA resource request, it can send the dedicated RA resources for the remote UE to the relay UE.

In S405, after receiving the dedicated RA resources that the base station allocates for the remote UE, the relay UE sends the dedicated resources to the remote UE.

Figure 8:
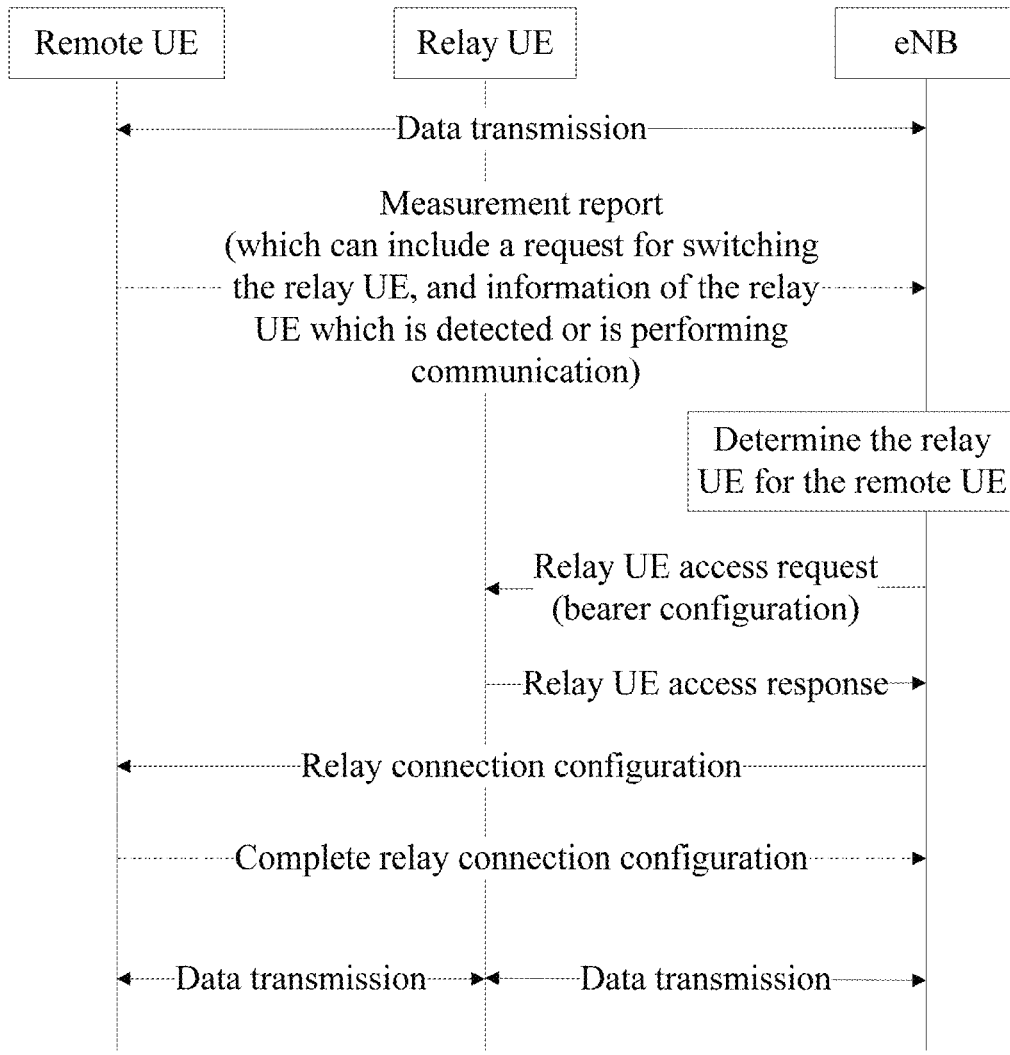
FIG. 8 is a second schematic diagram of replacing an access node according to an example of the disclosure.

In S406, the remote UE detects an available cell according to the auxiliary information and/or the dedicated RA resources received from the relay UE, and accesses the cell. For example, the remote UE detects the cell and accesses the base station as shown in FIG. 8.

In S407, alternatively, the remote UE can send the UE-to-network relay indication to the base station that it accesses, for indicating that the remote UE is accessing the network through the UE-to-network relay of the relay UE. Alternatively, the remote UE can also inform the base station of information (e.g. ID) of the accessed relay UE and the location information of the remote UE. Alternatively, the remote. UE can also report the measurement result of the relay UE and the serving cell/adjacent cell to the base station. The remote UE can receive the measurement reporting configuration information sent by the base station before sending the measurement report to the base station, and reports, according to the measurement report configuration information, the measurement result to the base station when the measurement reporting condition is satisfied. Alternatively, the remote UE can send the bearer handover request to the base station to request switching to the base station to perform the communication data transmission. The UE to NW relay indication in FIG. 7 is the UE-to-network relay indication.

In S408, if the base station determines that the remote UE can switch bearer to the base station, that is, the remote UE accesses the network through the base station to perform the communication data transmission, the base station sends the bearer handover indication to the UE for indicating the UE to switch from the communication data transmission through the D2D relay node to the communication data transmission through the base station.

S409; or, the base station can broadcast the bearer handover decision parameter information for the remote UE to judge whether to perform bearer handover, namely switching from the communication data transmission through the relay UE to the communication data transmission through the base station. The bearer handover decision parameter information includes one or a combination of the following: the measurement threshold value of RRM made by the UE on the serving cell and/or the adjacent cell, the measurement threshold value of D2D communication between the UE and the D2D relay node.

Note that, this step can replace S407 and S408, that is, if the base station broadcasts the handover decision parameter, the UE does not have to report the UE-to-network relay indication to the base station, and the base station does not have to perform bearer handover decision and send the bearer handover indication to the UE, but the UE determines by itself whether to perform data transmission through the base station.

In S410, if the remote UE receives the bearer handover indication, it determines that cellular communication data is transmitted through the base station, and initiates an Evolved Packet System (EPS) bearer establishment process. Alternatively, the remote UE can send the relay connection release message to the relay UE to inform the relay UE; or, the relay UE can release the connection between it and the remote UE after the activation timer (which is started/restarted when D2D data is received or sent to the remote UE) expires. Or, if the remote UE receives the bearer handover decision parameter information, the UE determines, according to the measurement results of the serving cell and/or the adjacent cell and/or the D2D relay node, by itself whether the cellular communication data is to be transmitted through the base station. If the measurement results satisfy a predefined rule, it is determined that the cellular communication data is to be transmitted through the base station, and the EPS bearer establishment process is initiated. Alternatively, the remote UE can send the relay connection release message to the relay UE to inform the relay UE; or, the relay UE can release the connection between it and the remote UE after the activation timer (which is started/restarted when the D2D data is received or sent to the remote UE) expires.

EXAMPLE 2

The present example describes the flow of a method that the UE which is accessing the network through the base station switches to the UE-to-network relay of the relay UE to access the network after moving out of the coverage area of the base station. FIG. 8 is the flowchart of the method according to the present embodiment; as shown in FIG. 8, the method according to the present embodiment includes the following steps.

In S501, the UE accesses the network through the base station and performs data transmission. When moving out of the coverage area of the cell, the UE can send the relay node access request indication to the base station, so as to request the base station for switching to a communication mode of accessing through the D2D relay node. Alternatively, the UE can also report the ID of the D2D relay node that the UE accesses or the D2D relay node information (e.g. identification information) detected by the UE to the base station. Alternatively, the UE can report its current location information or the measurement results of the accessed relay UE, the serving cell, and the adjacent cell to the base station.

In S502, the base station determines that the UE needs to access the network through the UE-to-network relay of the relay UE, and selects a relay UE for the UE. Alternatively, the base station can make a decision according to the information reported by the UE and selects the relay UE. As described in S501, the information reported by the UE may include one or a combination of the following: the relay node access request indication, the ID of the D2D relay node that the UE accesses or the D2D relay node information (e.g. the ID information) detected by the UE, the current location information of the UE, or the measurement results of the accessed relay UE, the serving cell, and the adjacent cell.

In S503, the base station sends the relay access request message to the selected D2D relay node. The relay access request message may include: ID information of the remote UE, communication service QoS demand information of the remote UE, D2D security capability information, D2D security related parameter information, D2D communication group ID information of the remote UE, the D2D relay type (namely the UE-to-network relay) that the remote UE requests, priority information of the remote UE, priority information of a D2D communication group in which the remote UE is, priority information of a D2D communication service of the remote UE, and configuration information of the D2D communication between the remote UE and the relay UE. The communication service QoS demand information of the remote UE may include a QoS Class Identifier (QCI), an Allocation and Retention Priority (ARP), Guaranteed Bit Rate (GBR), Maximum Bit Rate (MBR) and other information. The configuration information of the D2D communication between the remote UE and the relay UE may include D2D communication bearer configuration information, security related configuration information, and so on. The QoS is the abbreviation of quality of service.

In S504, the relay UE needs to perform admission control after receiving the relay access request message, and judges whether to allow the remote UE to access the network through the relay of the relay UE. Specifically, the relay UE can determine whether to allow the first D2D UE to access according to its own relay capability, transmitting-receiving capability, the number of D2D UEs that have been accessed, the priority information, and the communication service QoS demand of the D2D UE.

In S505, if the relay UE allows the remote UE to access, the relay UE sends a relay access response message to the base station. The relay access response message may include: ID information of the remote UE, and the configuration information of the D2D communication between the remote UE and the relay UE. The configuration information of the D2D communication between the remote UE and the relay UE may include the D2D communication bearer configuration information, the security related configuration information, and so on. If the relay UE does not allow the remote UE to access, it returns a reject message to the base station, and the base station selects another candidate relay UE for the remote UE.

In S506, after receiving the relay access response message, the base station sends access node change information to the remote UE to instruct the remote UE to access the relay UE. The access node change information may include: information of the D2D relay node to be accessed, D2D communication resource information which can be used for the D2D communication between the remote UE and the relay UE, the D2D communication bearer configuration information of the D2D communication between the remote UE and the relay UE, and the bearer handover indication. Specifically, the configuration information of the D2D communication between the remote UE and the relay UE may include the D2D communication bearer configuration information, the security related configuration information, and so on; the bearer handover indication is arranged to indicate whether the UE switches from the communication data transmission through the base station to the communication data transmission through the relay UE.

In S507, if the remote UE acknowledges that the cellular communication is performed through the relay of the relay UE, it sends an acknowledgement message to the base station. After that, the remote UE can perform the cellular communication through data forwarding of the relay UE.

Note that, both of the base stations in example 1 and example 2 can be the first base station, and the relay UE can be the second D2D UE in the above embodiments; and the remote UE can be the remote UE in the above embodiments.

First Device Embodiment

Figure 9:
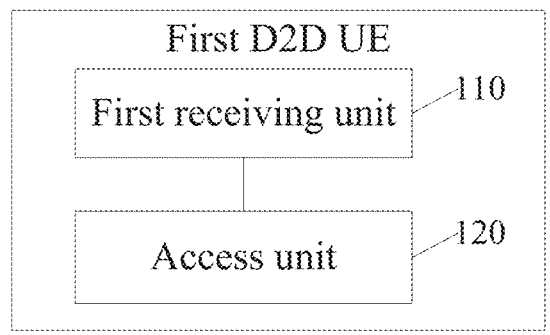
FIG. 9 is a structure diagram of a first D2D UE according to an embodiment of the disclosure.

As shown in FIG. 9, the present embodiment provides a communication node, which is the first D2D UE; the first D2D UE includes:

a first receiving unit 110, which is arranged to receive the auxiliary information from the first access node of the first D2D UE; and an accessing unit 120, which is arranged to access the second access node according to the auxiliary information; the first access node and the second access node are of different types.

The first D2D UE in the present embodiment can be communication terminals with a D2D communication function like a mobile phone or a tablet. The first receiving unit 110 can include one or more receiving antennas in the first D2D UE.

The accessing unit 120 can include various types of processors; the processor can control, by executing specified codes, the first D2D UE to access the second access node according to the auxiliary information. The processors can include electronic devices or a set of electronic devices, such as a central processing unit, a digital signal processor, a programmable array or an application processor or a microprocessor.

The first access node and the second access node are of different types; specifically, one is the device which is fixedly set and mainly used for the access of the UE, and the other is the device which can move and help other UE to access, e.g. the D2D UE which can serve as the relay node.

The first D2D UE in the present embodiment can be used for implementing the method in the embodiment of method, can acquire the auxiliary information by sending the auxiliary information acquiring request to the first access node according to the current communication demands and the current communication scenario, and can access the second access node according to the auxiliary information or access the second access node according to the auxiliary information actively pushed from the first access node; in a word, the first D2D UE of the present embodiment can access the second access node, thereby improving communication quality and keeping continuity of communication services.

There are two situations of the current access node of the first D2D UE; the structures of components and the relationship of the structures in the first D2D UE in different situations are respectively introduced below.

The first situation:

the second access node is the first base station, and the first access node is the relay node in the first cell or the second cell; the first cell is the cell of the first base station; the second cell is the adjacent cell of the first cell; and the relay node is the second D2D UE.

The first receiving unit 110 is configured for the first D2D UE to receive the auxiliary information from the relay node; the auxiliary information includes at least one of the cell information of the first cell and/or the adjacent cell of the first cell and the dedicated random access resource information.

The cell information includes at least one of the following: the frequency, the cell ID, the cell access barring indication and the cell access probability parameter; the cell access barred indication is arranged to indicate that the first D2D UE is barred to access the corresponding cell; and the cell access probability parameter is arranged to control a number of UEs accessing the corresponding cell.

The second situation:
the first access node is the first base station, and the second access node is the relay node in the first cell; the first cell is the cell of the first base station; and the relay node is the second D2D UE.

The first receiving unit 110 is arranged to receive the auxiliary information from the first base station; the auxiliary information includes the node information of the relay node that the first D2D UE can access, wherein the relay node is the second D2D UE;

the accessing unit 120 is arranged to access the relay node according to the auxiliary information.

At this time, the node information includes at least one of the following: the ID of relay node, the D2D discovery resource information used by the D2D relay node, the D2D communication resource information which can be used for D2D communication between the first D2D UE and the relay node, and the D2D communication bearer configuration information for the D2D communication between the first D2D UE and the relay node, Because it is the first base station connected with the first D2D UE, if it is needed to switch to the relay node to perform the communication data transmission, it is needed acquire the information of the selectable relay node from the auxiliary information, such as the ID of relay node, and information of the discovery resource and/or the communication resource.

The first receiving unit 110 is further arranged to receive the bearer control in formation.

The first D2D UE further includes:
a first switching unit, which is arranged to, according to the bearer control information, switch to the second access node to perform the communication data transmission.

The specific structure of the first switching unit can also correspond to any above processor.

The bearer control information includes the bearer handover indication; the bearer handover indication is arranged to indicate that the first D2D UE switches to the second access node to perform the communication data transmission; the first switching unit 130 is specifically arranged to switch to the second access node to perform the communication data transmission according to the bearer handover indication.

The bearer control information includes the bearer decision parameter information. At this time, the first D2D UE includes:
a first measuring unit, which is arranged to perform channel measurement based on the signal sent by the serving cell and/or the adjacent cell and/or the first access node of the first D2D UE, and form the first measurement;

a judging unit, which is arranged to determine, according to the bearer handover determination parameter information and the first measurement result, whether it is possible to switch to the second access node to perform the communication data transmission;

the first switching unit 130 is arranged to, if it is determined, according to the bearer handover determination parameter information and the first measurement result, that it is possible to switch to the second access node to perform the communication data transmission, switch to the second access node to perform the communication data transmission.

The first measuring unit can be a sensor, which can perform measurement on parameters like signal quality or signal intensity, in the first D2D UE, and its specific structure can refer to the sensor, which performs measurement on a discovery signal, in communication devices like the existing mobile phone, but it is not limited to this structure.

The specific structure of the judging unit can also correspond to the structure of the above processors or processing chips with an information judging function.

The bearer handover determination parameter information includes at least one of measurement threshold value of RRM made by the first D2D UE on the serving cell and the adjacent cell, and measurement threshold value of the signal sent by the second access node.

The first D2D UE further includes:
a first sending unit, which is further arranged to send the bearer handover decision auxiliary information to the first base station before switching to the second access node to perform the communication data transmission according to the bearer control information; the first base station is the first access node or the second access node.

The specific structure of the first sending unit in the present embodiment may include one or more sending antennas in the first D2D UE. The first receiving unit and the second sending unit can integrally correspond to the antenna with both a transmitting function and a receiving function.

The bearer handover decision auxiliary information also includes at least one of the following:
the UE-to-network relay indication information, the measurement report and the location information;

the UE-to-network relay indication information is arranged to indicate that the first D2D UE performs data transmission through the UE-to-network relay currently;

the measurement report includes results of RRM measurement made by the first D2D UE on the current serving cell and/or adjacent cell;

the location information includes the current geographical location information of the first D2D UE.

The first receiving unit 110 is further arranged to, before the UE sends the measurement report to the first base station, receive the measurement report configuration information sent by the first base station.

The first D2D UE further includes:
a second measuring unit, which is arranged to perform channel measurement according to the measurement report configuration information, and form the second measurement result;

the first sending unit is further arranged to, when the second measurement result satisfies the reporting condition, send the measurement report to the first base station.

The first sending unit is further arranged to, when the second measurement result satisfies the reporting condition, send the measurement report to the first base station. The related description of the reporting condition here can refer to the corresponding description in the embodiment of method, so it will not be repeated here.

Second Device Embodiment

The present embodiment provides a communication node, which is the first access node of the first D2D UE; the first access node in the present embodiment can be the eNB or the relay UE in FIG. 2 or FIG. 3.

Figure 10:
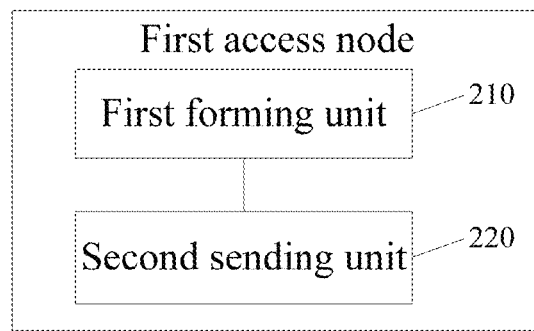
FIG. 10 is a structure diagram of an access node according to an embodiment of the disclosure.

As shown in FIG. 10, the first access node includes:
a first forming unit 210, which is arranged to form the auxiliary information, wherein the auxiliary information is used for the first D2D UE to access the second access node; the first access node and the second access node are of different types; and a second sending unit 220, which is arranged to send the auxiliary information to the first D2D UE.

The first forming unit 210 can he various types of processors or processing chips with the information forming function. The types of processors can refer to the embodiment of device 1, so it will not be repeated here.

The specific structure of the second sending unit 220 may include one or more sending antennas. When the first access node is the first base station, the second sending unit 220 can he a sending antenna array.

The structure of the first access node when the first access node is the relay node is introduced below.

If the first access node is the relay node:

the second access node is the first base station, and the first access node is the relay node in the first cell or the second cell; the first cell is the cell of the first base station; the second cell is the adjacent cell of the first cell; and the relay node is the second D2D UE.

The auxiliary information includes at least one of the cell information of the first cell and/or the adjacent cell of the first cell and the dedicated random access resource information.

The cell information includes at least one of the following:

the frequency, the cell ID, the cell access barring indication and the cell access probability parameter;

the cell access barred indication is arranged to indicate that the first D2D UE is barred to access the corresponding cell; and the cell access probability parameter is arranged to control a number of UEs accessing the corresponding cell.

Information contents and functions of these information can refer to the corresponding embodiment of method, so it will not be repeated here.

At this time, the second sending unit 220 is further arranged to, before sending the auxiliary information to the first D2D UE, request the first base station for the dedicated random access resource;

the first access node further includes a second receiving unit. The second receiving unit is arranged to receive the dedicated random access resource information sent by the first base station.

Here, the second receiving unit may include one or more receiving antennas in the relay node.

The first access node further includes:

a releasing unit, which is arranged to receive the connection release message from the first D2D UE, and after the connection release message is received, release the connection with the first D2D UE; or, the releasing unit is arranged to, when the connection release activation timer expires, release the connection with the first D2D UE.

The relay node in the embodiment also includes a timer; the timer can release, by counting down, the connection with the first D2D UE when timing to 0. The start of the timer can refer to the corresponding embodiment of method, so it will not be repeated here.

If the first access node is the first base station, the second access node is the relay node in the first cell; the first cell is the cell of the first base station; and the relay node is the second D2D UE.

The second sending unit 220 is configured for the first base station to send the auxiliary information to the first D2D UE; the auxiliary information includes the node information of the relay node that the first D2D UE can access, wherein the relay node is the second D2D UE.

Specifically, the node information includes at least one of the following: the ID of relay node, the D2D discovery resource information used by the D2D relay node, the D2D communication resource information which can be used for D2D communication between the first D2D UE and the relay node, and the D2D communication bearer configuration information for the D2D communication between the first D2D UE and the relay node.

The first forming unit 210 is arranged to determine the relay node which can be selected by the D2D UE to access, and form the auxiliary information based on the determined relay node. The second sending unit 220 is further arranged to send the relay node access request message to the relay node.

The first base station further includes:

a third receiving unit, which is arranged to receive the response message that the relay node sends when allowing the first D2D UE to access based on the request message.

The first forming unit is arranged to form the auxiliary information based on the response message.

The third receiving unit may include any air interface on the first base station, e.g. the air interface formed by any one or more sending antennas.

The first access node further includes:

a fourth receiving unit, which is arranged to, before forming the auxiliary information, receive the information related to the relay node from the first D2D UE, wherein the information related to the relay node is arranged to provide a basis for forming the auxiliary information.

Here, the fourth receiving unit and the third receiving unit can integrally correspond to the same air interface on the first base station, e.g. the same X2 interface, and can also correspond to different air interfaces.

The information related to the relay node may include at least one of the following: the relay node access request indication, the ID of relay node that the first D2D UE desires to access, the relay node information detected by the first D2D UE, the current location information of the first D2D UE, and the results of measurement made by the first D2D UE on the relay node, and/or the serving cell, and/or the adjacent cell that it accesses.

If the communication node is the first base station, the second sending unit 220 is further arranged to send the bearer control information to the first D2D UE;

the bearer control information is arranged to provide a basis for the first D2D node to switch to the second access node to perform the communication data transmission.

The bearer control information includes the bearer handover indication. The bearer handover indication is arranged to indicate the first D2D UE to switch to the second access node to perform the communication data transmission.

The bearer control information includes the bearer handover decision parameter information. The bearer handover decision parameter information is used for the first D2D UE to determine whether it is possible to switch to the second access node to perform the communication data transmission.

The communication node further includes: a fifth receiving unit, which is arranged to, before sending the bearer control information to the first D2D UE, receive the bearer handover decision auxiliary information sent by the first D2D UE; the first forming unit is arranged to form the bearer control information according to the bearer handover decision auxiliary information.

The information content of the bearer handover decision auxiliary information can refer to the above embodiments, so it will not be repeated here.

The communication node further includes: a sixth receiving unit, which is arranged to receive the auxiliary information acquiring request sent by the first D2D UE; the first forming unit 210 is specifically arranged to send the auxiliary information based on the auxiliary information acquiring request. In the communication node of the present embodiment, any two receiving units and/or sending units on the same communication node can respond to a communication interface with both a transmitting function and a receiving function, e.g. a transceiver antenna.

The fifth aspect of the disclosure also provides a computer storage medium, in which a computer executable instruction is stored; the computer executable instruction is used for performing at least one of the above methods shown in FIG. 4, FIG. 5, FIG. 6, FIG. 7 and FIG. 8.

The computer storage medium of the disclosure can be a mobile hard disk, a compact disc, a magnetic disk or a flash disc; the computer storage medium can be a non-instantaneous storage medium.

Those ordinary skill in the art may understand that all or part of the steps in the embodiments of method can be performed by hardware related to program instructions; the program instructions can be stored in computer readable storage media; when the program instructions are executed, the steps in the embodiments of the method are performed; the storage media include: a mobile storage device, a Read-Only Memory (ROM), a Random Access Memory (RAM), a magnetic disk, a compact disk, and other media being able to store program codes.

The above is only the specific implementation modes of the disclosure, but the protection scope of the disclosure is not limited this; any modification made according to the principles of the disclosure should fall within the protection scope of the disclosure.

INDUSTRIAL APPLICABILITY

In the disclosure, a mobile terminal switches to another access node according to the auxiliary information about changing the access node, so that it is convenient for a certain access node at an edge coverage location to switch to other access nodes and add other access nodes, thereby reducing the problem of poor communication quality like communication interruption.

The invention claimed is:

1. An information processing method, which is applied to a first Device-to-Device (D2D) User Equipment (UE), the method comprising:
receiving auxiliary information from a first access node of the first D2D UE; and
accessing a second access node according to the auxiliary information;
wherein the first access node and the second access node are of different types;
wherein the second access node is a first base station, and the first access node is a relay node in a first cell or a second cell; the first cell is a cell of the first base station; the second cell is an adjacent cell of the first cell; and the relay node is a second D2D UE,
wherein the receiving the auxiliary information from the first access node of the first D2D UE comprises:
receiving, by the first D2D UE, the auxiliary information from the relay node; wherein the auxiliary information comprises cell information of the first cell, cell information of the adjacent cell of the first cell and dedicated random access resource information,
wherein the cell information comprises the following:
a frequency, a cell Identity (ID), a cell access barring indication and a cell access probability parameter; wherein
the cell access barring indication is arranged to indicate that the first D2D UE is barred to access a corresponding cell; and
the cell access probability parameter is arranged to control a number of UEs accessing the corresponding cell.

2. The method according to claim 1, wherein the receiving the auxiliary information from the first access node of the first D2D UE comprises:
receiving the auxiliary information by receiving the cell information broadcast or unicast by the first access node;
or
receiving the auxiliary information by receiving the dedicated random access resource information unicast by the first access node.

3. The method according to claim 1, wherein the method further comprises:
sending an auxiliary information acquiring request to the first access node;
wherein the receiving the auxiliary information from the first access node of the first D2D UE comprises:
receiving the auxiliary information sent by the first access node based on the auxiliary information acquiring request.

4. An information processing method, which is applied to a first access node of a first Device-to-Device (D2D) User Equipment (UE), the method comprising:
forming auxiliary information, wherein the auxiliary information is used for the first D2D UE to access a second access node; the first access node and the second access node are of different types; and
sending the auxiliary information to the first D2D UE;
wherein the second access node is a first base station, and the first access node is a relay node in a first cell or a second cell; the first cell is a cell of the first base station; the second cell is an adjacent cell of the first cell; and the relay node is a second D2D UE,
wherein the auxiliary information comprises cell information of the first cell, cell information of the adjacent cell of the first cell and dedicated random access resource information,
wherein the cell information comprises the following:
a frequency, a cell Identity (ID), a cell access barring indication and a cell access probability parameter;
wherein the cell access barred indication is arranged to indicate that the first D2D UE is barred to access a corresponding cell; and
the cell access probability parameter is arranged to control a number of UEs accessing the corresponding cell.

5. The method according to claim 4, wherein before sending the auxiliary information to the first D2D UE, the method further comprises:
requesting the first base station for a dedicated random access resource; and
receiving the dedicated random access resource information sent by the first base station.

6. The method according to claim 4, wherein the method further comprises:
receiving a connection release message from the first D2D UE; and after the connection release message is received, releasing connection with the first D2D UE; or,
when a connection release activation timer expires, releasing the connection with the first D2D UE.

7. The method according to claim 4, wherein the method further comprises:
   receiving an auxiliary information acquiring request sent by the first D2D UE;
   wherein the forming the auxiliary information comprises: sending the auxiliary information based on the auxiliary information acquiring request.

8. A communication node, which is a first Device-to-Device (D2D) User Equipment (UE); the first D2D UE comprises: a first receiver, a processor, and a memory arranged to store instructions executable by the processor, wherein
   the first receiver is arranged to receive auxiliary information from a first access node of the first D2D UE; and
   the processor is arranged to access a second access node according to the auxiliary information;
   wherein the first access node and the second access node are of different types;
   wherein the second access node is a first base station, and the first access node is a relay node in a first cell or a second cell; the first cell is a cell of the first base station; the second cell is an adjacent cell of the first cell; and the relay node is a second D2D UE,
   wherein the first receiver is further arranged to receive the auxiliary information from the relay node; wherein the auxiliary information comprises cell information of the first cell, cell information of the adjacent cell of the first cell and dedicated random access resource information,
   wherein the cell information comprises the following:
   a frequency, a cell Identity (ID), a cell access barring indication and a cell access probability parameter; wherein
   the cell access barring indication is arranged to indicate that the first D2D UE is barred to access a corresponding cell; and
   the cell access probability parameter is arranged to control a number of UEs accessing the corresponding cell.

9. The communication node according to the claim 8, wherein the first D2D UE further comprises:
   a first sender, which is arranged to send an auxiliary information acquiring request to the first access node;
   wherein the first receiver is arranged to receive the auxiliary information sent by the first access node based on the auxiliary information acquiring request.

10. The communication node according to the claim 8, wherein,
   the first receiver is arranged to receive the auxiliary information by receiving the cell information broadcast or unicast by the first access node,
   or
   receive the auxiliary information by receiving the dedicated random access resource information unicast by the first access node.

11. A communication node, which is a first access node of a first Device-to-Device (D2D) User Equipment (UE); the first access node comprises: a second sender, a processor, and a memory arranged to store instructions executable by the processor, wherein
   the processor is arranged to form auxiliary information, wherein the auxiliary information is used for the first D2D UE to access a second access node; the first access node and the second access node are of different types; and
   the second sender is arranged to send the auxiliary information to the first D2D UE;
   wherein the second access node is a first base station, and the first access node is a relay node in a first cell or a second cell; the first cell is a cell of the first base station; the second cell is an adjacent cell of the first cell; and the relay node is a second D2D UE;
   wherein the auxiliary information comprises cell information of the first cell, cell information of the adjacent cell of the first cell and dedicated random access resource information;
   wherein the cell information comprises the following:
   a frequency, a cell ID, a cell access barring indication and a cell access probability parameter;
   the cell access barred indication is arranged to indicate that the first D2D UE is barred to access the corresponding cell; and
   the cell access probability parameter is arranged to control a number of UEs accessing the corresponding cell.

12. The communication node according to the claim 11, wherein the first access node further comprises:
   a fourth receiver, which is arranged to, before forming the auxiliary information, receive information related to the relay node from the first D2D UE, wherein the information related to the relay node is arranged to provide a basis for forming the auxiliary information.

13. The communication node according to the claim 12, wherein the information related to the relay node comprises at least one of the following:
   a relay node access request indication,
   Identity (ID) of the relay node that the first D2D UE desires to access,
   relay node information detected by the first D2D UE,
   the current location information of the first D2D UE, and
   results of measurement made by the first D2D UE on at least one of an accessed relay node, a serving cell, and an adjacent cell.

14. The communication node according to the claim 11, wherein the communication node further comprises:
   a sixth receiver, which is arranged to receive an auxiliary information acquiring request sent by the first D2D UE;
   the processor is arranged to send the auxiliary information based on the auxiliary information acquiring request.

* * * * *